United States Patent
Wang et al.

(10) Patent No.: US 10,230,282 B2
(45) Date of Patent: Mar. 12, 2019

(54) MOTOR AND STATOR THEREOF

(71) Applicant: JOHNSON ELECTRIC INTERNATIONAL AG, Murten (CH)

(72) Inventors: Zhen Kuan Wang, Shenzhen (CN); Moola Mallikarjuna Reddy, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 160 days.

(21) Appl. No.: 15/419,146

(22) Filed: Jan. 30, 2017

(65) Prior Publication Data

US 2017/0222511 A1    Aug. 3, 2017

(30) Foreign Application Priority Data

Feb. 3, 2016    (CN) ............ 2016 1 0078268

(51) Int. Cl.
| | |
|---|---|
| *H02K 3/34* | (2006.01) |
| *H02K 1/14* | (2006.01) |
| *H02K 3/32* | (2006.01) |
| *H02K 3/52* | (2006.01) |

(52) U.S. Cl.
CPC ............ *H02K 3/345* (2013.01); *H02K 1/146* (2013.01); *H02K 3/325* (2013.01); *H02K 3/522* (2013.01); *H02K 2203/12* (2013.01)

(58) Field of Classification Search
CPC ........ H02K 3/522; H02K 3/345; H02K 1/146; H02K 3/325; H02K 2203/12
See application file for complete search history.

(56) References Cited

U.S. PATENT DOCUMENTS

| | | | | |
|---|---|---|---|---|
| 5,969,455 | A * | 10/1999 | Sakamoto ............ | H02K 3/325 310/194 |
| 9,083,210 | B2 * | 7/2015 | Chen ................... | H02K 1/148 |
| 2005/0194860 | A1 * | 9/2005 | Lee ..................... | H02K 1/148 310/216.001 |
| 2009/0285699 | A1 | 11/2009 | Muraoka et al. | |
| 2009/0324435 | A1 * | 12/2009 | Sears ................... | H02K 3/522 417/423.7 |
| 2013/0134821 | A1 * | 5/2013 | Horng ................ | H01F 27/325 310/215 |
| 2016/0204661 | A1 * | 7/2016 | DeFilippis ........... | H02K 3/345 310/215 |

FOREIGN PATENT DOCUMENTS

| | | |
|---|---|---|
| EP | 1718793 A2 | 11/2006 |
| JP | 2010/200469 A | 9/2010 |

OTHER PUBLICATIONS

Hanselman, Duane C. "Brushless permanent magnet motor design", Jan. 1, 2006, Magna Physics Publishing, Lebanon, Ohio, USA; p. 111-114.

\* cited by examiner

*Primary Examiner* — Thanh Lam
(74) *Attorney, Agent, or Firm* — Muncy, Geissler, Olds & Lowe, P.C.

(57) ABSTRACT

A motor includes a stator and a rotor. The stator includes a stator core and a bobbin. The bobbin includes upper and lower bobbins covering the stator core from two axial ends. The upper and lower bobbins each include an end face and a side portion. The two end faces overlap two axial ends of the stator core. The side portions are aslant relative to the axial direction of the stator core. Ends of the upper and lower bobbins connected to the end faces form tight fit with the stator core, and the other ends away from the end faces form loose fit with the stator core.

16 Claims, 8 Drawing Sheets

MOTOR AND STATOR THEREOF

CROSS REFERENCE TO RELATED APPLICATIONS

This non-provisional patent application claims priority under 35 U.S.C. § 119(a) from Patent Application No. 201610078268.6 filed in The People's Republic of China on 3 Feb. 2016.

FIELD OF THE INVENTION

This invention relates to a motor, and in particular, to a stator of the motor.

BACKGROUND OF THE INVENTION

An outer rotor motor includes a stator and a rotor rotating around the stator. The stator includes a stator core and stator windings wound around the stator core. When the stator windings are energized, the stator core is polarized, and interacts with permanent magnets of the rotor to push the rotor to rotate continuously, which in turn drives a load connecting with the rotor. Generally, the stator windings are wound by enameled wires, which are easily scratched by edges of the stator core if directly wound on the stator core, resulting in short circuit. Thus, a bobbin is usually mounted on the stator core before winding process to separate the stator windings from the stator core. When the stator core of the stator has a large number of teeth, such as more than eight, interference can easily occur between the bobbin and the stator core during assembly, making it difficult to assemble. In order to solve this problem, in the art, the bobbin is usually made to have a large size deliberately to enlarge a gap between the bobbin and the stator core, forming loose fit as much as possible. However, the large bobbin occupies more space that is reserved for the windings, which reduces the slot fill factor of the motor and greatly affects an efficiency of the motor.

SUMMARY OF THE INVENTION

Thus, there is a desire for a stator which not only is convenient to assemble, but also can avoid the reducing of the slot fill factor, and a motor having the stator.

In one aspect, a stator is provided which includes a stator core, windings wound around the stator core, and a bobbin mounted to the stator core to separate the stator core from the windings. The stator core includes a yoke and a plurality of teeth extending radially from the yoke. Each of the teeth includes a tooth body connected to the yoke and a tooth tip formed at a distal end of the tooth body. The windings are wound around the tooth bodies. The bobbin includes an upper bobbin and a lower bobbin. The upper and lower bobbins cover the stator core from two axial ends of the stator core, respectively. The upper and lower bobbins each include an end face and a side portion extending from the end face. The side portions cover circumferential side surfaces of the tooth bodies, and opposed radial surfaces of the yoke and the tooth tips. The side portions are aslant relative to the axial direction of the stator, and ends of the side portions form loose fit with the stator core.

Preferably, sections of the side portions of the bobbin at the circumferential sides of each tooth body define a receiving groove for fitting the tooth body, and a width of the receiving groove increases gradually from the end face along a direction away from the end face.

Preferably, the width of the receiving groove at an axial end of the bobbin is greater than a width of the tooth body.

Preferably, the width of the receiving groove at a position adjacent to the end face is substantially the same as the width of the tooth body.

Preferably, sections of the side portions of the bobbin at the radial surface of the yoke facing to the tooth tips extend aslant from the end faces along a direction away from the yoke.

Preferably, sections of the side portions of the bobbin at radial surfaces of the tooth tips facing to the yoke extend aslant from the end faces along a direction away from the radial surfaces of the tooth tips.

Preferably, opposed axial ends of the upper and lower bobbins form L-shaped configurations that match each other, and are connected with each other with one inserted into the other.

Preferably, the teeth extend outwardly from the yoke.

In another aspect, a motor is provided which includes the above stator.

In another aspect, a motor is provided which includes a stator and a rotor being rotatably connected to the stator. The stator includes a stator core, and a bobbin covering the stator core. The bobbin includes an upper bobbin and a lower bobbin. The upper and lower bobbins cover the stator core from two axial ends of the stator core, respectively. The upper and lower bobbins each include an end face and a side portion extending from the end face. The two end faces of the upper and lower bobbins overlap two axial ends of the stator core, respectively. The side portions of the upper and lower bobbins are aslant relative to the axial direction of the stator core. Ends of the upper and lower bobbins which are connected to the end faces from tight fit with the stator core, and the other ends away from the end faces form loose fit with the stator core.

Preferably, the stator further includes windings wound around the stator core, and during winding, the windings make the side portions of the bobbin deformed to contact the stator core.

Preferably, an air gap is defined between the stator and rotor of the motor, a gap is defined between neighboring tooth tips of the stator, and a width of the gap is the same as or less than three times of a width of the air gap.

Preferably, the motor is an outer rotor motor.

More preferably, the motor is a single phase outer rotor motor.

DETAILED DESCRIPTION OF THE EMBODIMENTS

Figure 1:
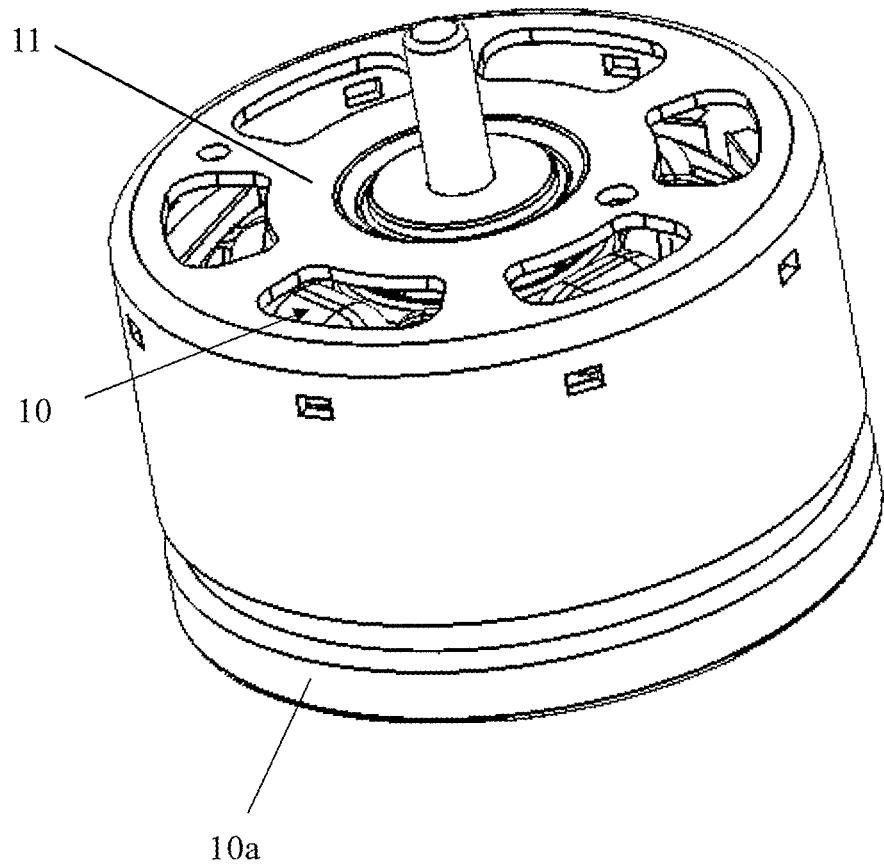
FIG. 1 is a schematic view of a motor according to an embodiment of the present invention.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

FIG. 1 shows an embodiment of the motor of the present invention. The motor includes a stator 10 and a rotor 11 rotatably mounted to the stator 10. The stator 10, when energized, interacts with the magnetic field of the rotor 11 to push the rotor 11 to rotate, which in turn drives a load connecting to the rotor. Preferably, the motor is a single phase outer rotor motor, and the rotor 11 surrounds the stator 10 and rotates relative to the stator 10.

Figure 2:
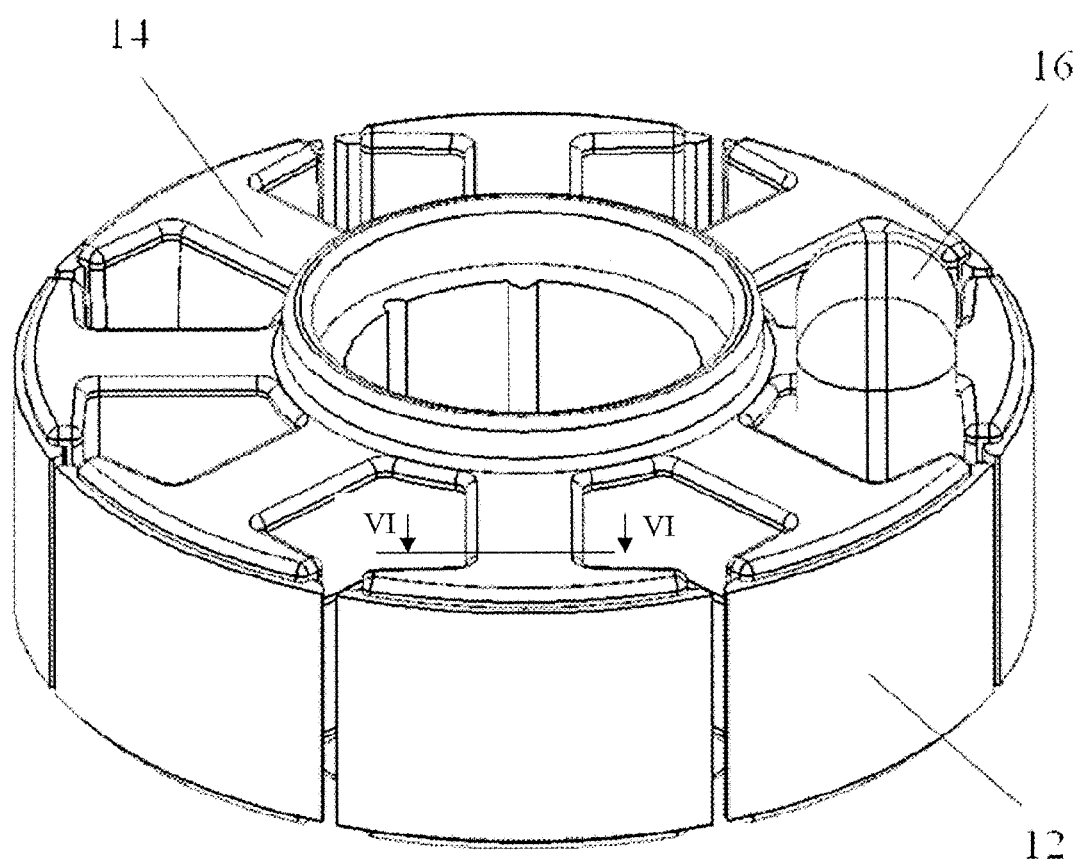
FIG. 2 is schematic view of a stator of the motor of FIG. 1.
Figure 3:
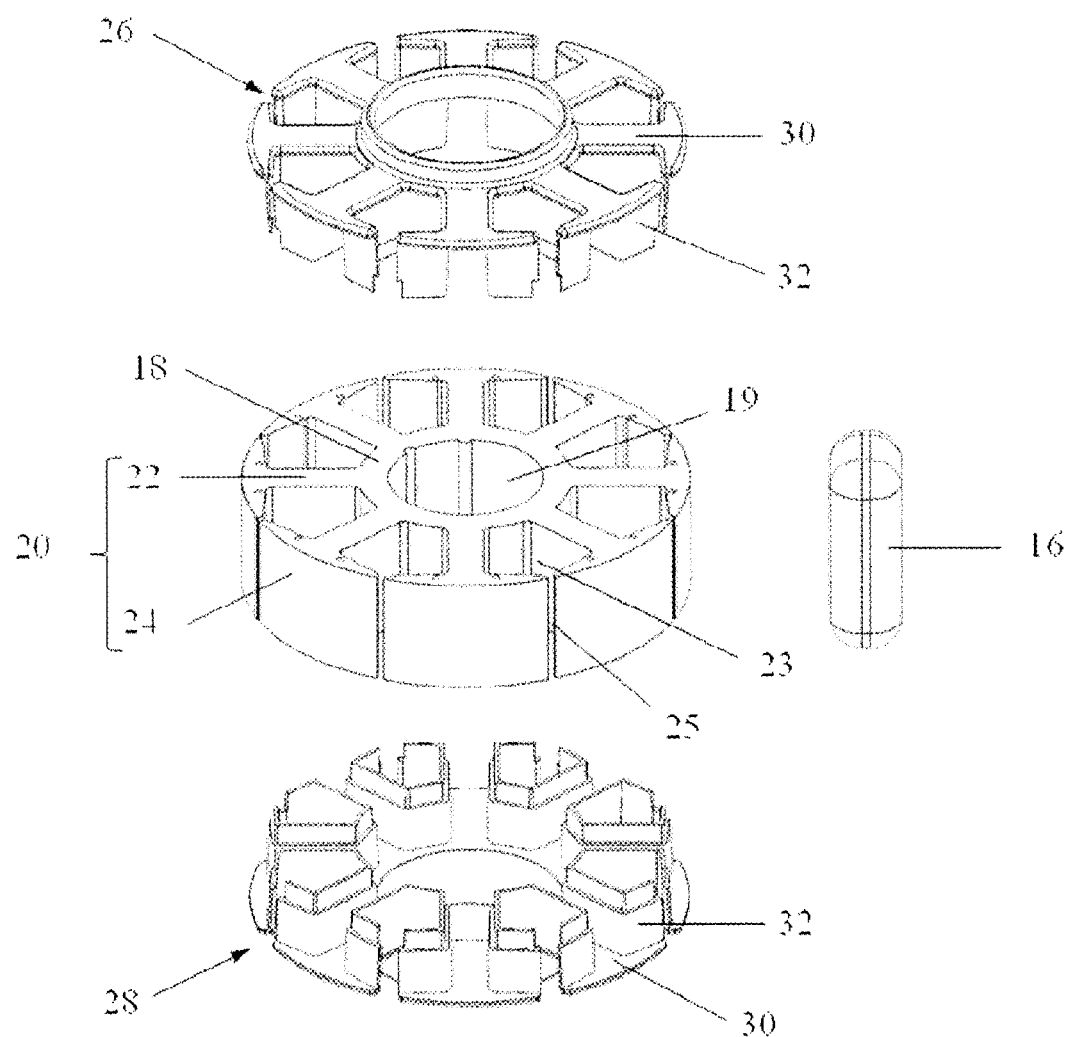
FIG. 3 is an exploded view of the stator of FIG. 2.

Please referring to FIG. 2 and FIG. 3, the stator 10 includes a base 10a, a stator core 12 fixed on the base 10a, a bobbin 14 mounted on the stator core 12, and a plurality of windings 16 wound around the bobbin 14. The stator core 12 is made by stacking a plurality of laminations made by magnetic materials, such as silicon steel. The stator core 12 includes a yoke 18, and a plurality of teeth 20 extending radially and outwardly from an outer periphery of the yoke 18. The yoke 18, for instant, is preferably annular and defines a mounting hole 19 therein, for engaging with a matching shaft tube (not shown) of the base 10a to fix the stator core 12 onto the base 10a. The teeth 20 are evenly spaced from each other along a circumferential direction of the yoke 18. Each of the teeth 20 includes a tooth body 22 extending radially outwardly from the yoke 18, and a tooth tip 24 formed at a distal end of the tooth body 22 and extending along a circumferential direction of the stator core 12. A slot 23 is defined between neighboring tooth bodies 22. A gap 25 is defined between neighboring tooth tips 24. The windings 16 are wound around the tooth bodies 22 and located radially inside the tooth tips 24. The tooth tips 24 are polarized when the windings 16 are energized, and function as magnetic poles of the stator 10. In the drawings, for clearly showing structure of elements, only the winding 16 on one of the tooth bodies 22 is shown, and the windings 16 on the other tooth bodies 22 are not shown.

The bobbin 14 is the stator core 12, and separates the windings 16 from the stator core 12. Preferably, the bobbin 14 is made of an insulating material, such as plastic. In this embodiment, the bobbin 14 includes an upper bobbin 26 and a lower bobbin 28. The upper and lower bobbins 26, 28 are substantially the same in shape, structure, and size. The upper bobbin 26 and the lower bobbin 28 are arranged face to face in an axial direction of the stator core 12, and cover the stator core 12 from two axial ends of the stator core 12, respectively. As shown in FIG. 3, the upper and lower bobbins 26, 28 each include an end face 30, and side portions 32 extending from the end face 30. The two end faces 30 of the two bobbins 26, 28 cover the two axial ends of the stator core 12, respectively. The side portions 32 of the two bobbins 26, 28 oppose to each other and cooperatively cover lateral surfaces of the stator core 12 at the slots 23, i.e. a radial outer surface of the yoke 18, a radial inner surface of each tooth tip 24, and two circumferential side surfaces of each tooth body 22.

Figure 4:
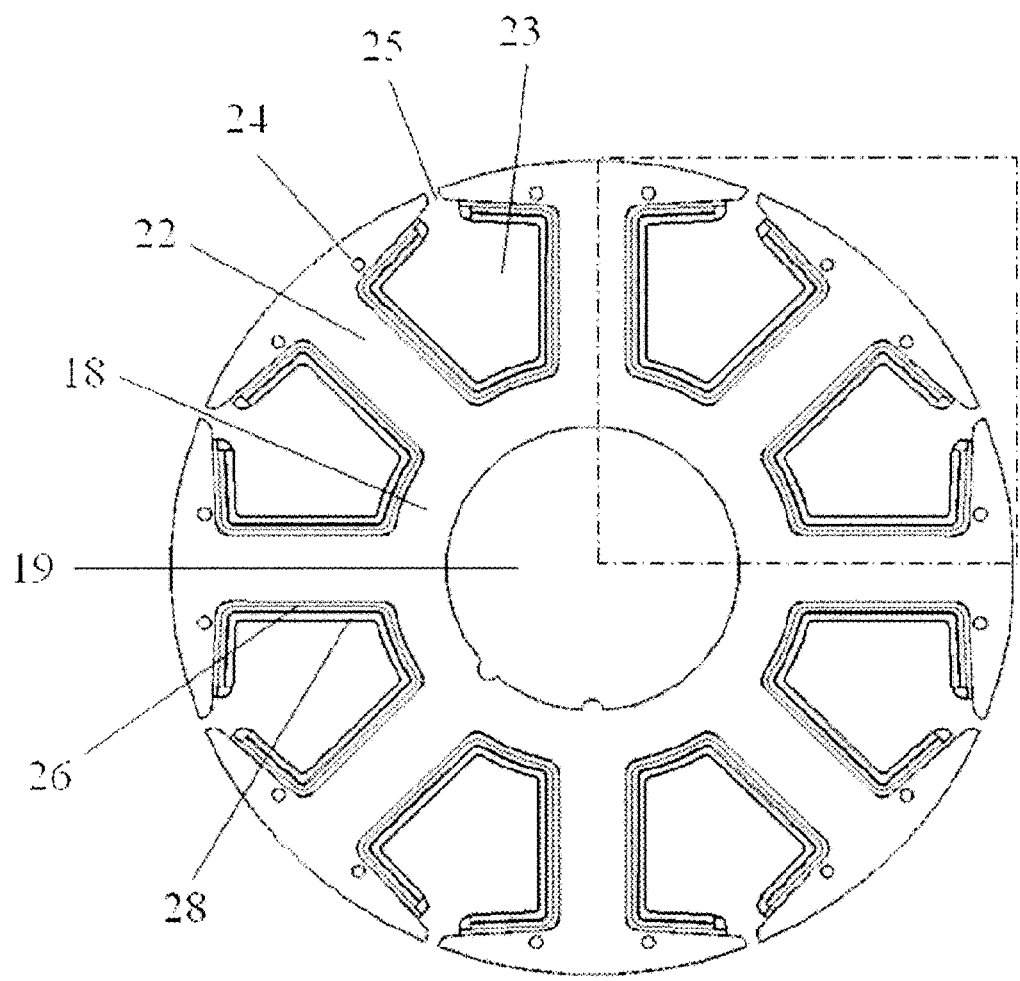
FIG. 4 is a transverse cross sectional view of the stator of FIG. 2.
Figure 5:
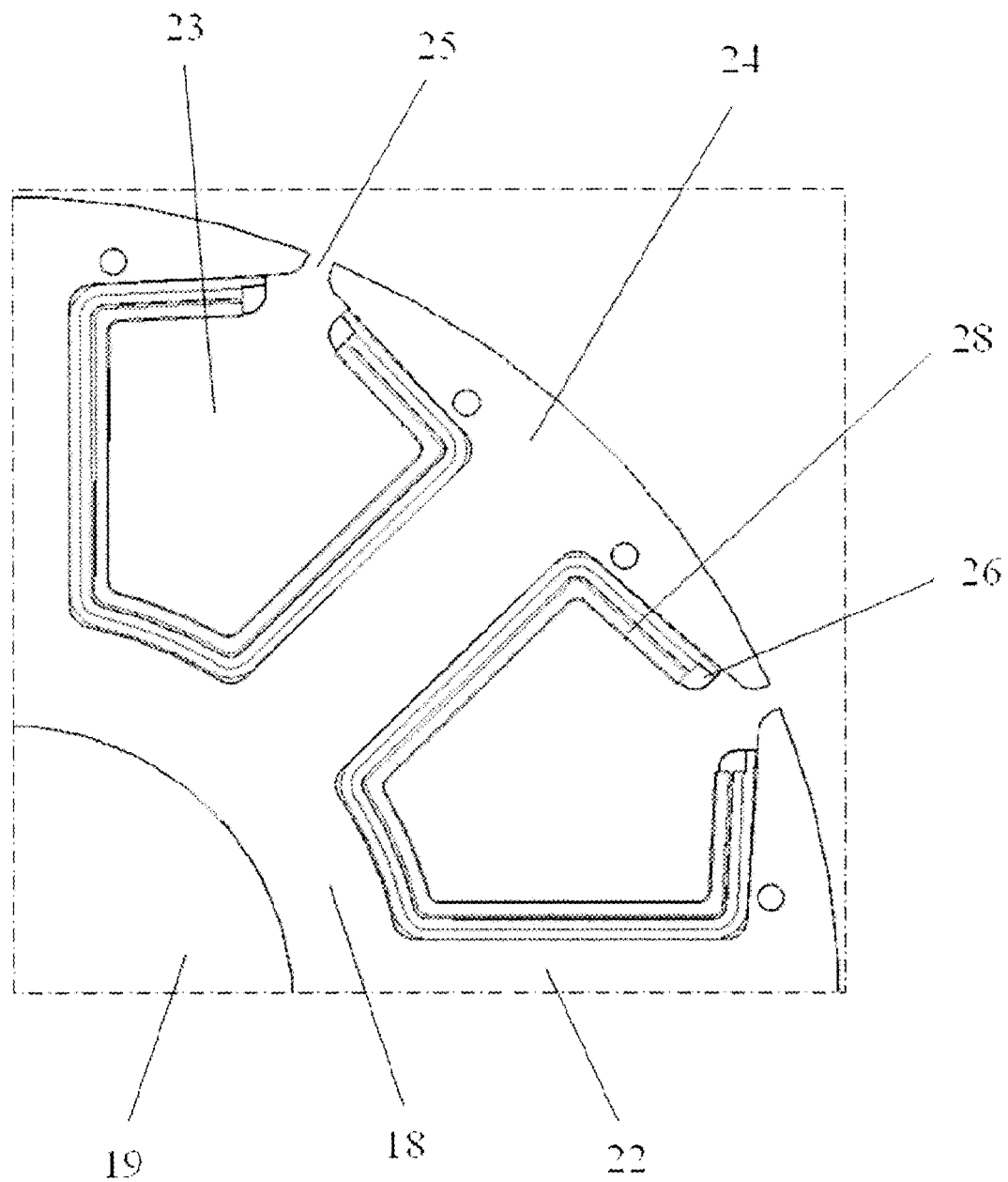
FIG. 5 is an enlarged view of a dashed box of FIG. 4.

Referring to FIG. 4 and FIG. 5, the tooth tip 24 has a large width along the circumferential direction, and thus the gap 25 defined between neighboring tooth tips 24 is narrow, which results in a small cogging torque, and thus stable operation and low noise of the motor. Preferably, a width of the gap 25 is less than three times of a width of an air gap between the rotor 11 and the stator 10. In order to avoid affecting winding process of the windings 16, a portion of the bobbin 14 attached on each tooth tip 24 has a circumferential width less than that of the tooth tip 24. Two ends of the tooth tip 24 along the circumferential direction extend beyond the bobbin 14 (as shown in FIG. 2), and the side portions 32 do not cover two circumferential edges of the inner surface of the tooth tip 24. Due to winding process and safety consideration, the windings 16 do not fully fill the slots 23, and thus the edges of the inner surfaces of the tooth tips 24 not covered by the side portions 32 of the bobbin 14 will not contact the windings 16 to avoid short circuit. Preferably, the portion of the bobbin 14 covering each tooth tip 24 has a circumferential width greater than that of a corresponding one of the windings 16 to completely avoid the contact between the windings 16 and the tooth tips 24.

Figure 6:
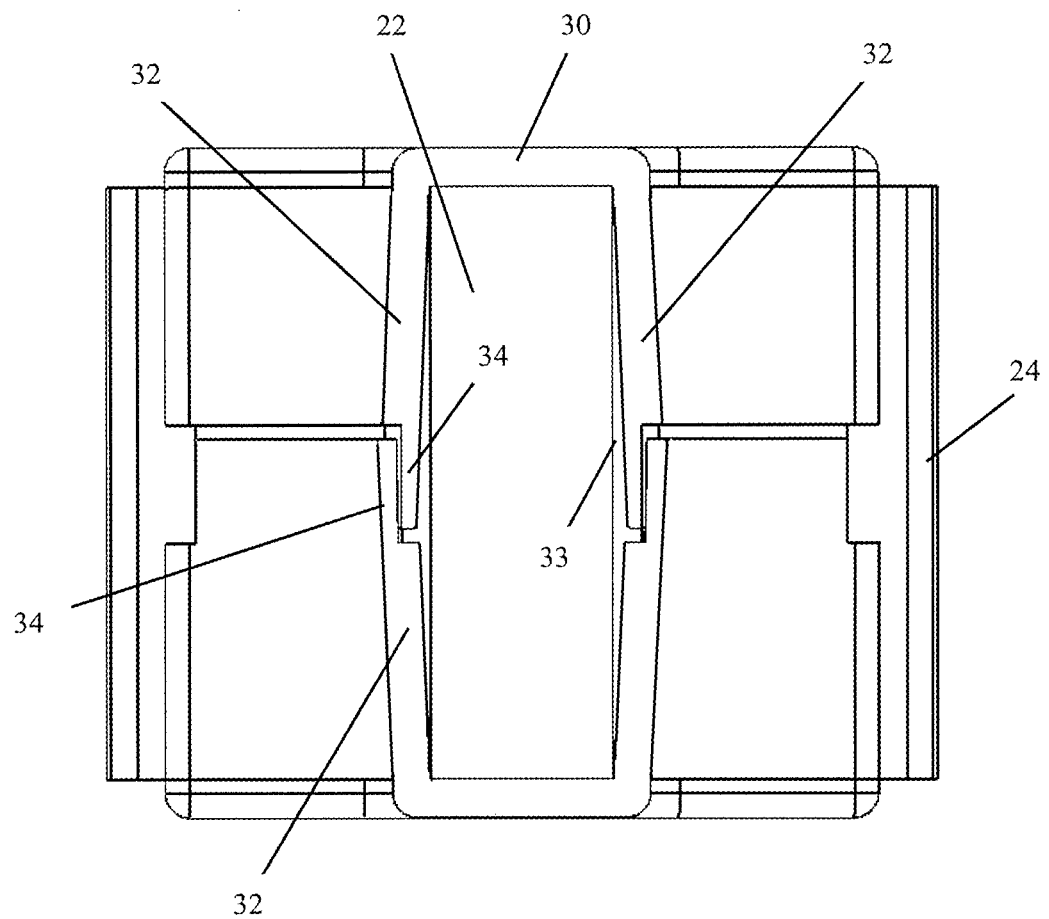
FIG. 6 is a cross sectional view of FIG. 2 taken along line VI-VI thereof.

In this embodiment, the end faces 30 of the upper and lower bobbins 26, 28 are horizontal, and cover axial end faces of the stator core 12. As shown in FIG. 6, for each of the bobbins 26, 28, sections of the side portions 32 at two circumferential sides of each tooth body 22 extend to form a receiving groove 33 therebetween for fitting the tooth body 22. The side portions 32 are aslant relative to the axial direction of the stator 10, with ends of the side portions 32 expanding slightly to form a tapered opening, which causes a width of the receiving groove 33 to increase gradually from the end face 30 along a direction away from the end face 30, thus facilitating fitting the tooth bodies between the side portions 32 of the bobbins 26, 28 and hence assembly of the bobbins 26, 28 and the stator core 12. Preferably, the width of the receiving groove 33 at a position adjacent to the end face 30 is substantially the same as or less than that of the tooth body 22, which ensures that tight fit is formed between the bobbins 26, 28 and the stator core 12.

Figure 7:
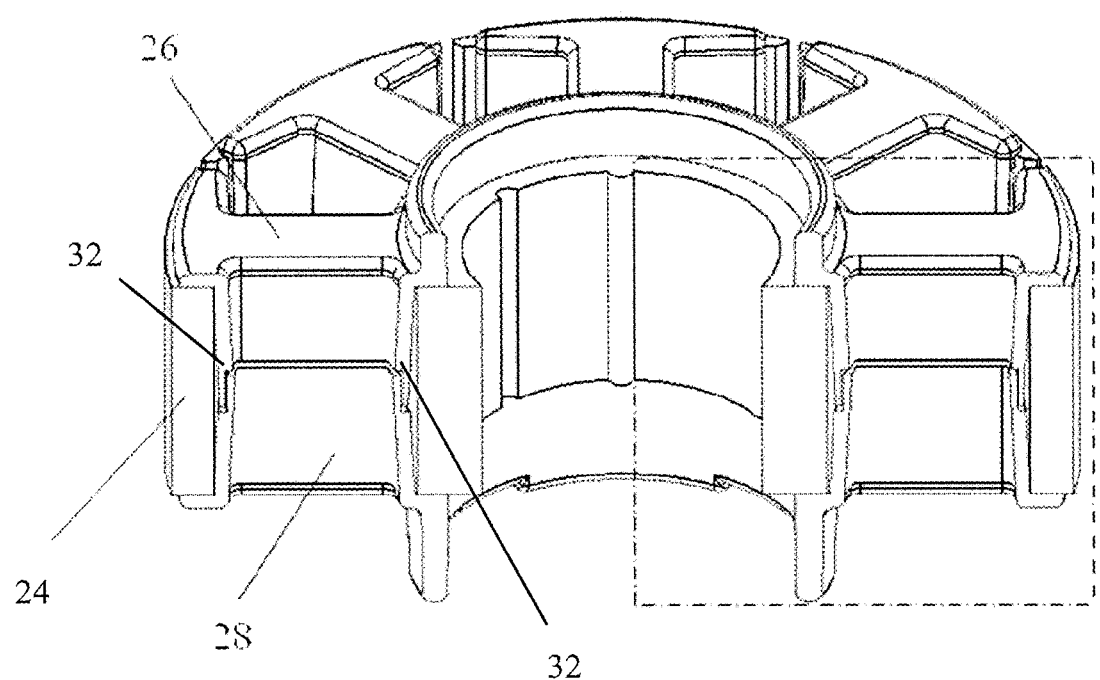
FIG. 7 is a longitudinal cross sectional view of the stator of FIG. 2.
Figure 8:
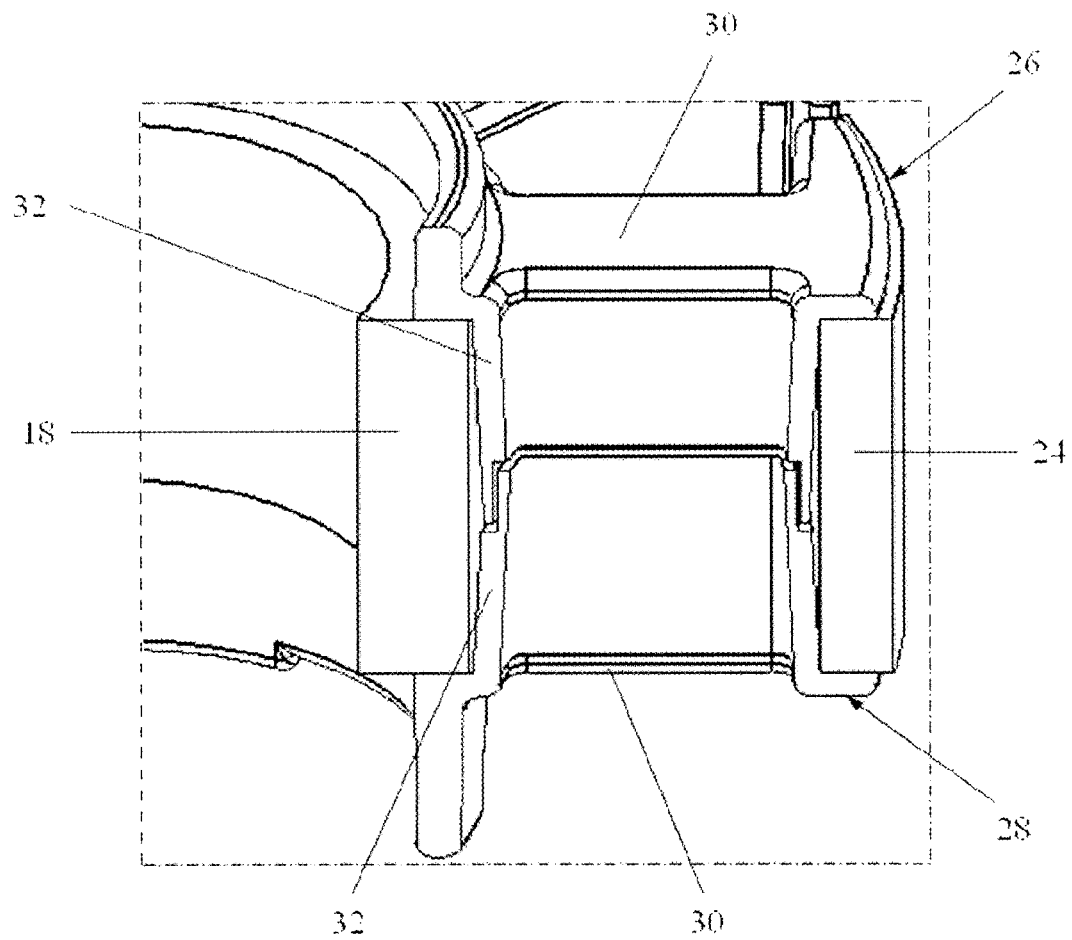
FIG. 8 is an enlarged view of a dashed box of FIG. 7.

Referring to FIG. 7 and FIG. 8, sections of the side portions 32 of the bobbins 26, 28 for covering the outer surface of the yoke 18 also extend aslant relative to the axial direction of the stator 10 from the end faces 30, with ends thereof away from the end faces 30 extending along a direction away from the yoke 18, thus forming a loose fit with the yoke 18 to facilitate assembly with the yoke 18. Preferably, sections of the side portions 32 of the bobbins 26, 28 covering the inner surfaces of the tooth tips 24 also extend aslant relative to the axial direction of the stator 10 from the end faces 30 along a direction away from the inner surfaces of the tooth tips 24, such that ends of the sections of the side portions 32 of the bobbins 26, 28 covering the inner surfaces of the tooth tips 24 form loose fit with the tooth tips 24, thus facilitating assembly with the tooth tips 24.

Preferably, the side portion 32 of each of the bobbins 26, 28 has an axial height slightly greater than half of an axial height of the stator core 12. Thus, a sum of the axial heights of the side portions 32 of the two bobbins 26, 28 is greater than the height of the stator core 12. During assembly, the two bobbins 26, 28 partly overlap in the axial direction to ensure that the bobbins 26, 28 completely cover the outer surface of the yoke 18, the side surfaces of the tooth bodies 22, and the inner surfaces of the tooth tips 24 to completely insulate the windings 16 from the stator core 12. Preferably, the end 34 of each side portion 32 is generally L-shaped, and the ends 34 of the two bobbins 26, 28 match each other in shape. During assembly, the two bobbins 26, 28 are placed over the stator core 12 from two axial ends of the stator core 12 and then moved towards each other until the end 34 of one bobbin (in this embodiment, the lower bobbin 28) surrounds the end 34 of the other bobbin (in this embodiment, the upper bobbin 26). L-shaped step faces of the bobbins 26, 28 are connected with each other, with one inserted into the other to achieve an axial positioning, and assembly of the bobbins 26, 28 and the stator core 12 is thereby accomplished.

Because the side portions 32 of the bobbins 26, 28 are slant, during assembly, the bobbins 26, 28 form loose fit with the stator core 12 at the ends of the side portions 32, which avoids interference with the stator core 12. Therefore, the stator core 12 can be guided into the bobbins 26, 28 and then fixed in place easily, which meets positioning and guiding requirements of the stator core during manual or auto assembly, and is easy to operate, thus significantly improving the production efficiency and reducing risks such as deformation, breakage, and damage of the bobbin 14 due to the difficulties in installation. Preferably, after assembled, the side portions 32 form tight fit with the stator core 12 at positions adjacent to the end faces 30 to ensure fixation between the bobbins 26, 28 and the stator core 12, which avoids falling off of parts during moving and assembling/disassembling fixtures at a next working position, such as a working position for winding of the windings 16.

Thus, there is no need to enlarge the whole size of the bobbin 14 of the stator 10 of the motor of the present invention, but instead utilizes the size difference between the two ends to achieve convenient and quick assembly of the bobbin 14, and the assembled bobbin 14 will not affect winding of the windings 16 by not occupying too much space that is reserved for the windings 16. In addition, after assembly of the bobbin 14 and the stator core 12, tight fit is formed at the two axial ends of the stator core 12, and a narrow gap is formed at a middle of the stator core 12. During winding, by utilizing characteristic of the aslant side portions 32 being capable of deformation, winding forces on the side portions 32 of the bobbins 26, 28 make the side portions 32 plastically deform inwardly to intimate contact the stator core 12, which makes the bobbin 14 occupy as little space reserved for the windings 16 as possible, and maximize the power and efficiency of the motor. Furthermore, the upper and lower bobbins 26, 28 form the step faces that are connected with one inserted into the other, which effectively increases the creepage distance and hence ensures electrical safety.

The embodiments described above are illustrative rather than limiting. Various modifications can be apparent to persons skilled in the art without departing from the scope of the invention, and all of such modifications should fall within the scope of the present invention.

The invention claimed is:

1. A stator comprising:
a stator core comprising a yoke and a plurality of teeth extending radially from the yoke, each of the teeth comprising a tooth body connected to the yoke and a tooth tip formed at a distal end of the tooth body;
windings wound around the tooth bodies; and
a bobbin mounted to the stator core to separate the windings from the stator core, the bobbin comprising an upper bobbin and a lower bobbin, the upper and lower bobbins covering the stator core from two axial ends of the stator core, respectively, the upper and lower bobbins each comprising an end face and a side portion extending from the end face, the side portions covering circumferential side surfaces of the tooth bodies and opposed radial surfaces of the yoke and the tooth tips, the side portions being aslant relative to the axial direction of the stator, ends of the side portions forming loose fit with the stator core.

2. The stator of claim 1, wherein sections of the side portions of the bobbin at the circumferential sides of each tooth body define a receiving groove for fitting the tooth body, and a width of the receiving groove increases gradually from the end face along a direction away from the end face.

3. The stator of claim 2, wherein the width of the receiving groove at an axial end of the bobbin is greater than a width of the tooth body.

4. The stator of claim 3, wherein the width of the receiving groove at a position adjacent to the end face is substantially the same as the width of the tooth body.

5. The stator of claim 1, wherein sections of the side portions of the bobbin at the radial surface of the yoke facing to the tooth tips extend aslant from the end faces along a direction away from the yoke.

6. The stator of claim 1, wherein sections of the side portions of the bobbin at radial surfaces of the tooth tips facing to the yoke extend aslant from the end faces along a direction away from the radial surfaces of the tooth tips.

7. The stator of claim 6, wherein opposed axial ends of the upper and lower bobbins form L-shaped configurations that match each other, and are connected with each other with one inserted into the other.

8. The stator of claim 1, wherein during winding, the windings make the side portions of the bobbin deformed to contact the stator core.

9. The stator of claim 1, wherein the teeth extend outwardly from the yoke.

10. A motor comprising a stator and a rotor rotatably connected to the stator, the stator comprising:
a stator core comprising a yoke and a plurality of teeth extending radially from the yoke, each of the teeth comprising a tooth body connected to the yoke and a tooth tip formed at a distal end of the tooth body;
windings wound around the tooth bodies; and
a bobbin mounted to the stator core to separate the stator core from the windings, the bobbin comprising an upper bobbin and a lower bobbin, the upper and lower bobbins covering the stator core from two axial ends of the stator core, respectively, the upper and lower bobbins each comprising an end face and a side portion extending from the end face, the side portions covering circumferential side surfaces of the tooth bodies and opposed radial surfaces of the yoke and the tooth tips, the side portions being aslant relative to the axial direction of the stator, ends of the side portions forming loose fit with the stator core.

11. A motor comprising a stator and a rotor rotatably connected to the stator, the stator comprising:
a stator core, and
a bobbin covering the stator core, the bobbin comprising an upper bobbin and a lower bobbin, the upper and lower bobbins covering the stator core from two axial ends of the stator core, respectively, the upper and lower bobbins each comprising an end face and a side portion extending from the end face, the two end faces of the upper and lower bobbins overlapping two axial ends of the stator core, respectively, the side portions of the upper and lower bobbins being aslant relative to the axial direction of the stator core, ends of the upper and lower bobbins which are connected to the end faces forming tight fit with the stator core, and the other ends away from the end faces forming loose fit with the stator core.

12. The motor of claim 11, wherein the side portions of the upper and lower bobbins partly overlap in the axial direction, each side portion is L-shaped at an end away from the end face, and the ends of the two side portions match each other and are connected with one inserted into the other to achieve positioning thereof.

13. The motor of claim 11, wherein the stator further comprises windings wound around the stator core, and during winding, the windings make the side portions of the bobbin deformed to contact the stator core.

14. The motor of claim 11, wherein an air gap is defined between the stator and rotor of the motor, a gap is defined between neighbouring tooth tips of the stator, and a width of the gap is the same as or less than three times of a width of the air gap.

15. The motor of claim 11, wherein the motor is an outer rotor motor.

16. The motor of claim 15, wherein the motor is a single phase motor.

* * * * *